(12) United States Patent
Liu

(10) Patent No.: US 12,183,036 B2
(45) Date of Patent: Dec. 31, 2024

(54) IMAGE PROCESSING METHOD AND APPARATUS, ELECTRONIC DEVICE, AND STORAGE MEDIUM

(71) Applicant: Tencent Technology (Shenzhen) Company Limited, Guangdong (CN)

(72) Inventor: Jie Liu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 173 days.

(21) Appl. No.: 17/706,242

(22) Filed: Mar. 28, 2022

(65) Prior Publication Data

US 2022/0215583 A1 Jul. 7, 2022

Related U.S. Application Data

(63) Continuation of application No. PCT/CN2020/125081, filed on Oct. 30, 2020.

(30) Foreign Application Priority Data

Jan. 14, 2020 (CN) .......................... 202010036516.7

(51) Int. Cl.
*G06T 7/73* (2017.01)
*G06T 17/20* (2006.01)
(Continued)

(52) U.S. Cl.
CPC ................ *G06T 7/75* (2017.01); *G06T 17/20* (2013.01); *G06T 19/00* (2013.01); *G06V 40/23* (2022.01); *G06T 2207/30196* (2013.01)

(58) Field of Classification Search
CPC .... G06T 7/70; G06T 7/73; G06T 7/75; G06T 7/77; G06T 2219/2016; G06T 2207/30196
See application file for complete search history.

(56) References Cited

U.S. PATENT DOCUMENTS

| 2009/0179899 A1 | 7/2009 | Gregory et al. |
| 2013/0127853 A1 | 5/2013 | Corazza et al. |

(Continued)

FOREIGN PATENT DOCUMENTS

| CN | 109395390 A | 3/2019 |
| CN | 111223171 A | 6/2020 |

(Continued)

OTHER PUBLICATIONS

Jain, Arjun, et al. "Moviereshape: Tracking and reshaping of humans in videos." ACM Transactions on Graphics (TOG) 29.6 (2010): 1-10 (Year: 2010).*

(Continued)

*Primary Examiner* — Diane M Wills
(74) *Attorney, Agent, or Firm* — Crowell & Moring LLP

(57) ABSTRACT

This disclosure provides an image processing method and apparatus, an electronic device, and a storage medium. The method includes: obtaining, by an electronic device, a reference surface model of a first skeleton posture of a virtual object; obtaining one or more second skeleton postures of the virtual object; generating an one or more exemplary surface models of the one or more second skeleton postures based on the reference surface model and the one or more second skeleton postures; determining a posture transformation matrix between the first skeleton posture and the second skeleton posture; and converting the exemplary surface model and the reference surface model to a same coordinate space based on the posture transformation matrix, to generate the virtual object according to the reference surface model and the one or more exemplary surface models in the coordinate space.

16 Claims, 9 Drawing Sheets

(51) Int. Cl.
*G06T 19/00* (2011.01)
*G06V 40/20* (2022.01)

(56) References Cited

U.S. PATENT DOCUMENTS

| | | | |
|---|---|---|---|
| 2017/0032055 A1* | 2/2017 | Eisemann | G06F 17/10 |
| 2019/0206145 A1* | 7/2019 | Li | G06T 15/503 |
| 2020/0005138 A1* | 1/2020 | Wedig | G06N 3/08 |
| 2020/0005537 A1 | 1/2020 | Inagaki et al. | |
| 2022/0383579 A1 | 12/2022 | Iwamoto et al. | |

FOREIGN PATENT DOCUMENTS

| | | | |
|---|---|---|---|
| JP | 2008-237327 A | | 10/2008 |
| JP | 2016122297 A | * | 7/2016 |
| WO | WO 2019/242454 A1 | | 12/2019 |
| WO | WO 2021/143278 A1 | | 7/2021 |

OTHER PUBLICATIONS

Extended European Search Report for corresponding application No. EP 20913250.5 dated Nov. 2, 2022, 10p.

Rhee, Taehyun et al., "Real-Time Weighted Pose-Space Deformation on the GPU", Computer Graphics Forum: Journal of the European Association for Computer Graphics, The Eurographics Association and Blackwell Publishing, vol. 25, No. 3, Dec. 7, 2006, pp. 439-448.

Sloan, Peter-Pike J. et al., "Shape by Example", Proceedings of the 2001 Symposium on Interactive 3D Graphics, ACM,. Mar. 19, 2001, pp. 135-143, US.

Lewis, J.P. et al., "Pose Space Deformation: A Unified Approach to Shape Interpolation and Skeleton-Driven Deformation", Computer Graphics 2000 Conference Proceedings SIGGRAPH, ACM, Jul. 23, 2022, pp. 165-172, US.

Kavan, Ladislav et al., "Spherical Blend Skinning: A Real-time Deformation of Articulated Models", ACM, 2005, 9p.

Jollin, Kidux, "Auto-Rig Pro (blender rig kit)", found at https://www.blendercn.org/6378.html, Dec. 20, 2019, 6p, printed from the internet on Feb. 3, 2022, China.

International Search Report and Written Opinion for priority application No. PCT/CN2020/125081 dated Jan. 27, 2021, 10p. in Chinese language.

English language translation of the International Search Report for priority application No. PCT/CN2020/125081 dated Jan. 27, 2021, 2p.

Concise Explanation of Relevancy.

Office Action for corresponding Korean application No. 9-5-2023-072778732 dated Aug. 9, 2023, 8p, in Korean language.

English language translation for Request for the Submission of an Opinion (Office Action) for corresponding Korean application No. 9-5-2023-072778732 dated August 9, 2023, 9p.

* cited by examiner

IMAGE PROCESSING METHOD AND APPARATUS, ELECTRONIC DEVICE, AND STORAGE MEDIUM

RELATED APPLICATION

This application is a continuation application of and claim priority to International Patent Application No. PCT/CN2020/125081, filed Oct. 30, 2020, which claims priority to Chinese Patent Application No. 202010036516.7, filed on Jan. 14, 2020. Both of the applications above are incorporated herein by reference in their entireties.

TECHNICAL FIELD

This disclosure relates to the field of image processing, and in particular, to an image processing method and apparatus, an electronic device, and a computer-readable storage medium.

BACKGROUND

With the rapid development of information technologies, a channel for perceiving an environment and obtaining information is expanded. Especially a virtualization display technology can implement display of a virtual object according to actual requirements, and it has various typical application scenarios, for example, displaying a virtual object in a game virtual scene to interact with a user.

During continuous development and updating of the technologies, requirements of a user for the virtual object become increasingly high, for example, the virtual object is required to be more realistic and vivid, and have art expressiveness. For a virtual object mainly relying on visual output information, the virtual object is directly optimized at a visual level to meet the user requirements. Therefore, at a virtual object generation stage, various surface deformations (for example, a part of the virtual object is shaken) may need to be applied to the virtual object.

SUMMARY

An embodiment of this disclosure provides an image processing method, including obtaining at least one reference surface model of a first skeleton posture of a virtual object; obtaining one or more second skeleton postures of the virtual object; generating one or more exemplary surface models of the one or more second skeleton postures based on the at least one reference surface model and the one or more second skeleton posture; determining a posture transformation matrix between the first skeleton posture and the one or more second skeleton postures; and converting the one or more exemplary surface models and the at least one reference surface model to a coordinate space based on the posture transformation matrix to generate the virtual object according to the at least one reference surface model and the one or more exemplary surface model in the coordinate space.

An embodiment of this disclosure further provides an image processing apparatus, including a first obtaining module, configured to obtain at least one reference surface model of a first skeleton posture of a virtual object; a second obtaining module, configured to obtain a second skeleton posture of the virtual object; a generation module, configured to generate an exemplary surface model of the second skeleton posture based on the at least one reference surface model and the second skeleton posture; a matrix determining module, configured to determine a posture transformation matrix between the first skeleton posture and the second skeleton posture; and a coordinate space conversion module, configured to convert the exemplary surface model and the at least one reference surface model to a same coordinate space based on the posture transformation matrix, to generate the virtual object according to the at least one reference surface model and the exemplary surface model in the coordinate space.

An embodiment of this disclosure provides an electronic device, including: a memory, configured to store computer-readable instructions; and a processor, configured to execute the computer-readable instructions stored in the memory, to cause the electronic device to perform methods provided in the embodiments of this disclosure.

An embodiment of this disclosure provides a non-transitory computer-readable storage medium, storing computer-readable instructions, the computer-readable instructions, when executed by a processor, causing an electronic device to perform methods provided in the embodiments of this disclosure.

BRIEF DESCRIPTION OF THE DRAWINGS

The above and other objectives, features, and advantages of this disclosure will become more apparent from the detailed description of exemplary embodiments of this disclosure with refer to the accompanying drawings.

DESCRIPTION OF EMBODIMENTS

Figure 1:
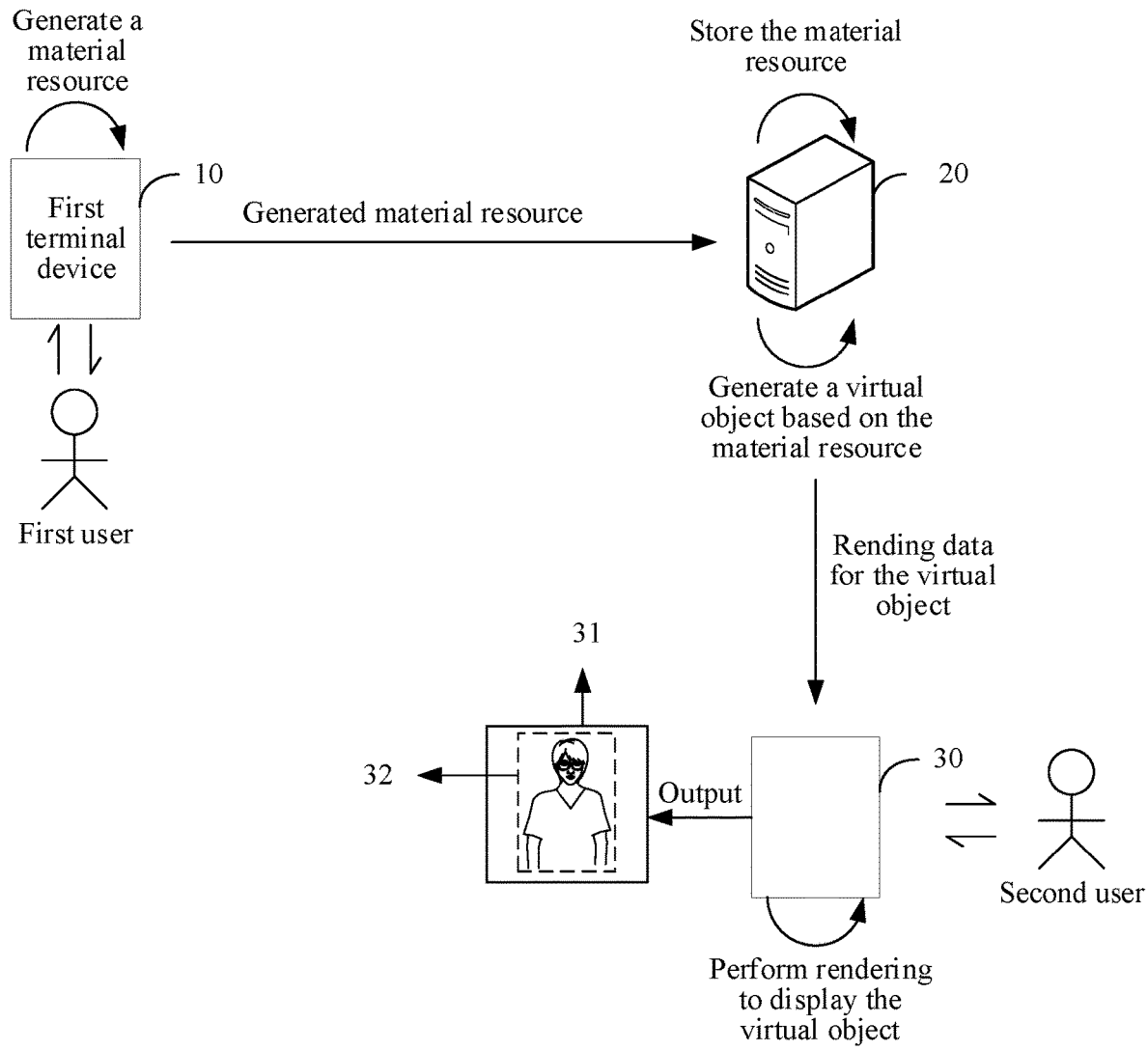
FIG. 1 is a schematic architectural diagram of an image processing system according to an embodiment of this disclosure.

At present, the exemplary implementations are described comprehensively with reference to the accompanying drawings. However, the examples of implementations can be implemented in various forms, and it is not to be understood as being limited to the examples described herein. Conversely, the examples of implementations are provided to make the description of this disclosure more comprehensive and complete, and comprehensively convey the idea of the examples of the implementations to a person skilled in the art. The accompanying drawings are merely exemplary illustrations of this disclosure and are not necessarily drawn to scale. The same reference numbers in the accompanying drawings represent the same or similar parts, and therefore, repeated descriptions thereof are omitted.

In addition, the described features, structures, or characteristics may be combined in one or more exemplary implementations in any appropriate manner. In the following description, many specific details are provided to give a full understanding of the exemplary implementations of this disclosure. However, a person skilled in the art is to be aware that, the technical solutions in this disclosure may be implemented without one or more of the particular details, or another method, unit, or step may be used. In other cases, well-known structures, methods, implementations, or operations are not shown or described in detail, to avoid obscuring the aspects of this disclosure.

Some of the block diagrams shown in the accompanying drawings are functional entities and do not necessarily correspond to physically or logically independent entities. The functional entities may be implemented in the form of software, or implemented in one or more hardware modules or integrated circuits, or implemented in different networks and/or processor apparatuses and/or micro-controller apparatuses.

In the following description, the term "some embodiments" describes subsets of all possible embodiments, but it may be understood that "some embodiments" may be the same subset or different subsets of all the possible embodiments, and can be combined with each other without conflict. In the following description, the term "a plurality of" refers to at least two.

Unless otherwise defined, meanings of all technical and scientific terms used in this specification are the same as that usually understood by a person skilled in the technical field to which this disclosure belongs. Terms used in this specification are merely intended to describe objectives of the embodiments of this disclosure, but are not intended to limit this disclosure.

First, some concepts involved in the embodiments of this disclosure are briefly described.

(1) Virtual scene: A scene that is outputted by using a device and that is different from the real world. Visual perception of the virtual scene can be formed with the aid of naked eyes or devices, for example, by using two-dimensional images outputted by using a display screen or three-dimensional images outputted by using a three-dimensional display technology such as a three-dimensional projection, virtual reality, or augmented reality technology. In addition, a variety of perception simulating the real world such as auditory perception, tactile perception, olfactory perception, and motion perception can be further formed by using a variety of possible hardware.

(2) Virtual object: Avatars of various people and objects that can interact in a virtual scene, or movable objects in a virtual scene. A virtual object may be generated by using a game engine, drawing software, or another image processing tool, and a core technology used for generating the virtual object is a three-dimensional image technology. The movable object may be a virtual character, a virtual animal, a cartoon character, or the like, for example, a character, an animal, a plant, an oil drum, a wall, or a stone displayed in a virtual scene. The virtual object may be a virtual image used for representing a user in the virtual scene. The virtual object has a shape and a volume in the virtual scene, and occupies some space in the virtual scene. In the embodiments of this disclosure, the virtual object may be an animation character. The image processing method provided in the embodiments of this disclosure is applicable to an image processing process of an animation character in a skeletal animation.

(3) Skeletal animation: one of model animations. In the skeletal animation, a virtual object (for example, an animation character) includes at least two kinds of data, a skeleton posture and a surface model. The skeleton posture describes an orientation and a position of a "skeleton" of a virtual object. The surface model describes a plurality of vertices on a surface of the virtual object, that is, the surface model may be understood as a set of a series of vertices on the surface of the virtual object. A change of the skeleton posture can correspondingly drive a change of the surface model, so that a corresponding animation can be generated by driving the skeleton posture.

(4) Skin processing: To achieve that "a change of the skeleton posture can correspondingly drive a change of the surface model", it is necessary to define which vertices on the surface of the virtual object can be driven by a specific skeleton, and a process of defining which vertices on the surface of the virtual object can be driven by the specific skeleton (that is, binding the specific skeleton to a specific vertex on the surface of the virtual object) is referred to as skin processing.

(5) Skeleton-skinning model: refers to a model with skeleton-skinning information obtained after skin processing is performed on the surface model according to the skeleton posture. The skeleton-skinning model mainly includes two parts of information: surface information (surface data) and skeleton-skinning information.

(6) Surface deformation: When a virtual object is generated, an additional surface deformation may need to be added to the virtual object, so as to meet a specific service requirement. For example, after skin processing and another necessary processing process are performed, a fat animation character has been generated, but in an actual service requirement, when the animation character is required to move, the fat on the waist of the animation character can shake like in real life. Even further, the fat shakes more exaggeratively than the real life, to meet an art requirement. In this case, an additional surface deformation that can simulate the shaking of the fat needs to be added to the animation character. It may be understood that in an actual application, the additional surface deformation may be a non-linear surface deformation and even may be a complex non-linear surface deformation that is difficult to capture the deformation rule.

(7) Material resource: In this embodiment of this disclosure, before a virtual object is actually generated, a related material resource is made (produced) in advance. The material resource includes a reference surface model and an exemplary surface model. The reference surface model is a preset most basic material resource, and there may be only one reference surface model. The exemplary surface model is a material resource further obtained based on the reference surface model, and there may be only one or at least two exemplary surface models.

With the development of technologies, requirements for visual performance of a virtual object become increasingly high, and various surface deformations (for example, a complex non-linear surface deformation) need to be applied to a virtual object at a virtual object generation stage. However, in a current skeletal animation technology, the surface deformation cannot be supported at the virtual object generation stage, the compatibility with the surface deformation is low, and the requirements cannot be met.

An embodiment of this disclosure provides an image processing method and apparatus, an electronic device, and a computer-readable storage medium, which can avoid the impact of the surface deformation during generation of a material resource to support the surface deformation at the virtual object generation stage, thereby improving the compatibility with the surface deformation.

As an example, FIG. 1 is a schematic architectural diagram of an image processing system according to an embodiment of this disclosure. In FIG. 1, the image processing system includes a first terminal device 10, a server, 20, and a second terminal device 30.

In some embodiments, for example, an electronic device is a terminal device, and the image processing method provided in this embodiment of this disclosure may be implemented by the terminal device. For ease of understanding, the first terminal device 10 is used as an example for description. For example, the first terminal device 10 may generate a material resource. The first terminal device 10 may provide related functions of making a material resource to a first user, for example, a function of determining a surface model and a function of adjusting a skeleton posture, so as to generate the material resource under the operation of the first user. The first terminal device 10 may store the generated material resource locally, generate a virtual object according to the stored material resource as required, and render the generated virtual object to display the virtual object, for example, to display the virtual object in an output virtual scene. The method is applicable to a scenario in which a terminal device has a relatively strong computing capability.

In some embodiments, for example, the electronic device is a server, and the image processing method provided in this embodiment of this disclosure may be implemented by the server. For example, the server 20 may automatically generate a material resource, for example, generate the material resource according to a first skeleton posture, a second skeleton posture, and a reference surface model that are pre-stored, and store the generated material resource locally. The server 20 may further generate a virtual object according to the stored material resource and sends rendering data for the generated virtual object to the terminal device, so that the terminal device displays the virtual object, for example, displays the virtual object in a virtual scene outputted by the terminal device.

In some embodiments, the image processing method provided in this embodiment of this disclosure may be further cooperatively implemented by the terminal device and the server. For example, at a material resource generation stage, the first terminal device 10 and the server 20 are mainly involved. The first terminal device 10 mainly serves as a front end and is used for generating a material resource in response to an operation of a first user. The server 20 mainly serves as a rear end, and is used for providing corresponding function support (for example, a function of determining a surface model and a function of adjusting a skeleton posture) to the first terminal device 10 during generation of the material resource, and storing the material resource sent by the first terminal device 10.

At a virtual object generation stage, the second terminal device 30 and the server 20 are mainly involved. The server 20 mainly serves as the rear end, and is used for generating a virtual object according to the stored material resource, and sending rendering data for the generated virtual object to the second terminal device 30. The second terminal device 30 mainly serves as the front end, and is used for performing rendering according to the rendering data received from the server 20, to display the virtual object, for example, to display the virtual object in the output virtual scene, so as to facilitate a second user to watch or interact. As an example, FIG. 1 shows a virtual scene 31 outputted by the second terminal device 30 and a virtual object 32 in the virtual scene 31. The virtual scene 31 and the virtual object 32 may be displayed in a graphical interface of the second terminal device 30.

This embodiment is only an exemplary description, and does not limit the function and scope of this disclosure.

Figure 2:
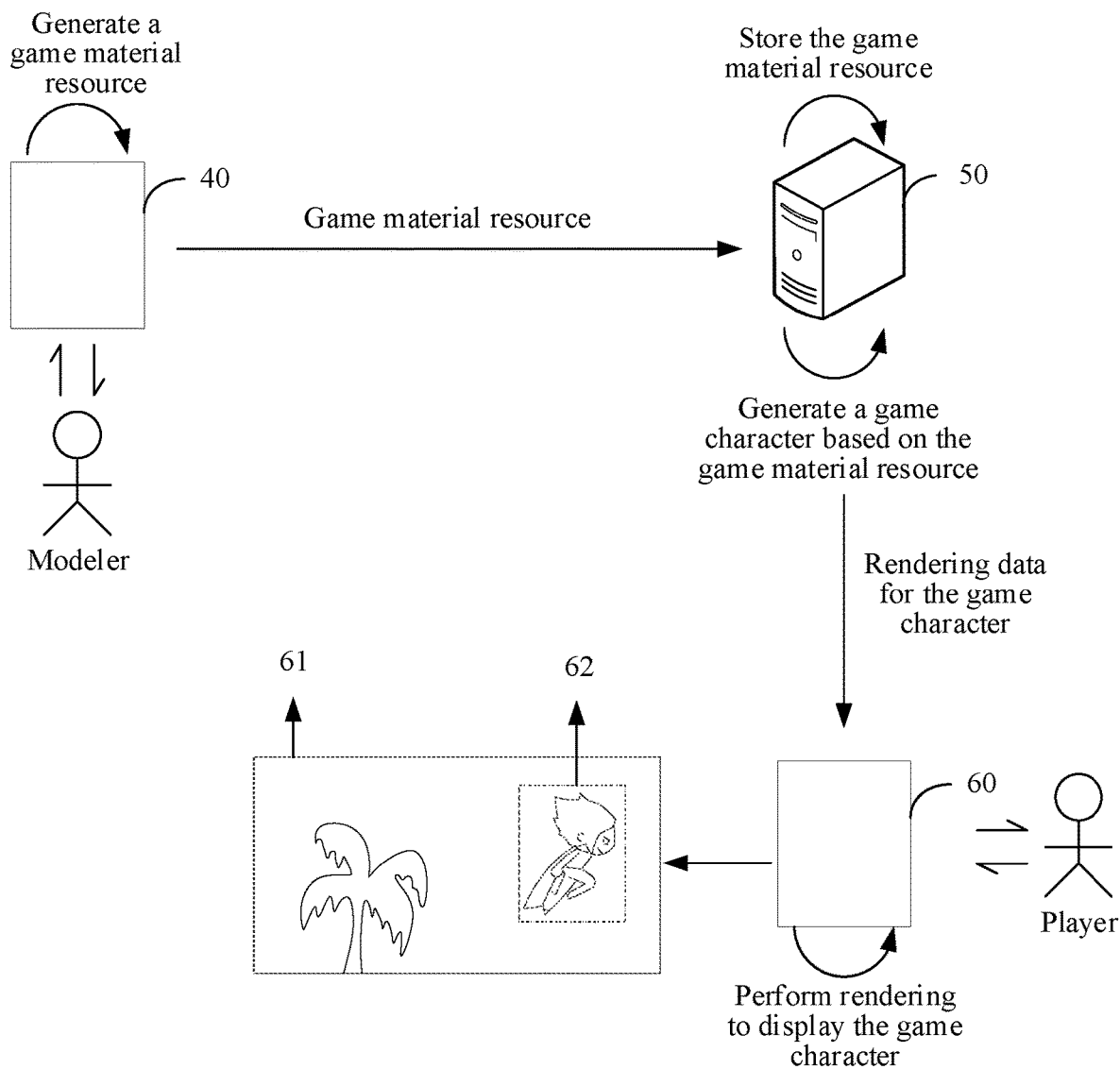
FIG. 2 is a schematic architectural diagram of an image processing system applied to a game scene according to an embodiment of this disclosure.

As an example, FIG. 2 is a schematic architectural diagram of an image processing system in a game scene according to an embodiment of this disclosure. The image processing system in FIG. 2 includes a modeler terminal device 40, a game server 50, and a game player terminal device 60. For ease of understanding, a case that the image processing method provided in this embodiment of this disclosure is cooperatively implemented by a terminal device and a server is used as an example for description.

At a material resource generation stage, the modeler terminal device 40 and the game server 50 are mainly involved. The modeler terminal device 40 mainly serves as a front end, and is used for generating a game material resource in response to a production operation of a modeler for the game material resource (for example, a surface model of a game character in a natural standing posture and a surface model of a game character in a double-arm opening posture). The game server 50 mainly serves as a rear end, and is used for providing corresponding function support to the model terminal device 40 during generation of the game material resource and storing the game material resource sent by the modeler terminal device 40.

The modeler may perform corresponding art work (for example, modifying a surface model of a game character by using a graphics tablet or modifying a surface model of a game character by using a mouse instruction and a keyboard instruction) on the modeler terminal device 40, so that the modeler terminal device 40 can generate a corresponding game material resource under the support of the game server 50.

At a virtual object generation stage, the game player terminal device 60 and the game server 50 are mainly involved. The game server 50 mainly serves as the rear end, and is used for generating a virtual object according to the stored game material resource. A case that the virtual object is a game character is used as an example, and the game server 50 is further used for sending rendering data for the generated game character to the game player terminal device 60. The game player terminal device 60 mainly serves as the front end, and is used for performing rendering according to the rendering data received from the game server 50, to display the game character, for example, display the game character in an output game virtual scene. As an example, FIG. 2 shows a game virtual scene 61 outputted by the game player terminal device 60 and a game character 62 in the game virtual scene 61.

A game player may perform a game operation (for example, controlling the movement of the game character 62 by using a mouse, controlling skill casting of the game character 62 by using a keyboard, or controlling the movement and skill casting of the game character 62 by touching a screen) on the game player terminal device 60, to control the game character 62 displayed by the game player terminal device 60. In this process, the game player terminal device 60 generates a corresponding instruction in response to the game operation of the player and sends the instruction to the game server 50. The game server 50 may generate a new game character according to the received instruction and the stored game material resource. For example, the game character 62 shown in FIG. 2 is in a jumping state, and the generated new game character may be the game character 62 in a standing posture, that is, a skeleton posture is changed.

This embodiment is only an exemplary description, and does not limit the function and scope of this disclosure.

In some embodiments, the terminal device may implement the image processing method provided in this embodiment of this disclosure by running a computer program. For example, the computer program may be a native program or a software module in an operating system. The computer program may be a native application (APP), that is, a program that needs to be installed in the operating system to run, for example, a game APP; or may be an applet, that is, a program that needs to be downloaded to a browser environment to run; or may be an applet that can be embedded into any APP. In conclusion, the computer program may be an APP, a module, or a plug-in in any form.

This embodiment of this disclosure may be implemented by using a cloud technology. The cloud technology is a hosting technology that unifies a series of resources such as hardware, software, and networks in a wide area network or a local area network to implement computing, storage, processing, and sharing of data. In another sense, the cloud technology is also a collective name of a network technology, an information technology, an integration technology, a management platform technology, an application technology, and the like based on an application of a cloud computing business mode, and may form a resource pool. Usage is based on a requirement and is flexible and convenient. A cloud computing technology becomes an important support. A background service of a technical network system requires a large amount of computing and storage resources.

In some embodiments, the server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. For example, the cloud service may be a service for generating a material resource or a service for generating a virtual object for invoking of the terminal device. The terminal device may be a smartphone, a tablet computer, a notebook computer, a desktop computer, a smart watch, a smart television, or the like, but is not limited thereto. The terminal device and the server may be directly or indirectly connected in a wired or wireless communication manner. This is not limited in this embodiment of this disclosure.

The image processing method provided in the embodiments of the application is described with reference to an exemplary application and implementation of the electronic device provided in this embodiment of the application.

Figure 3A:
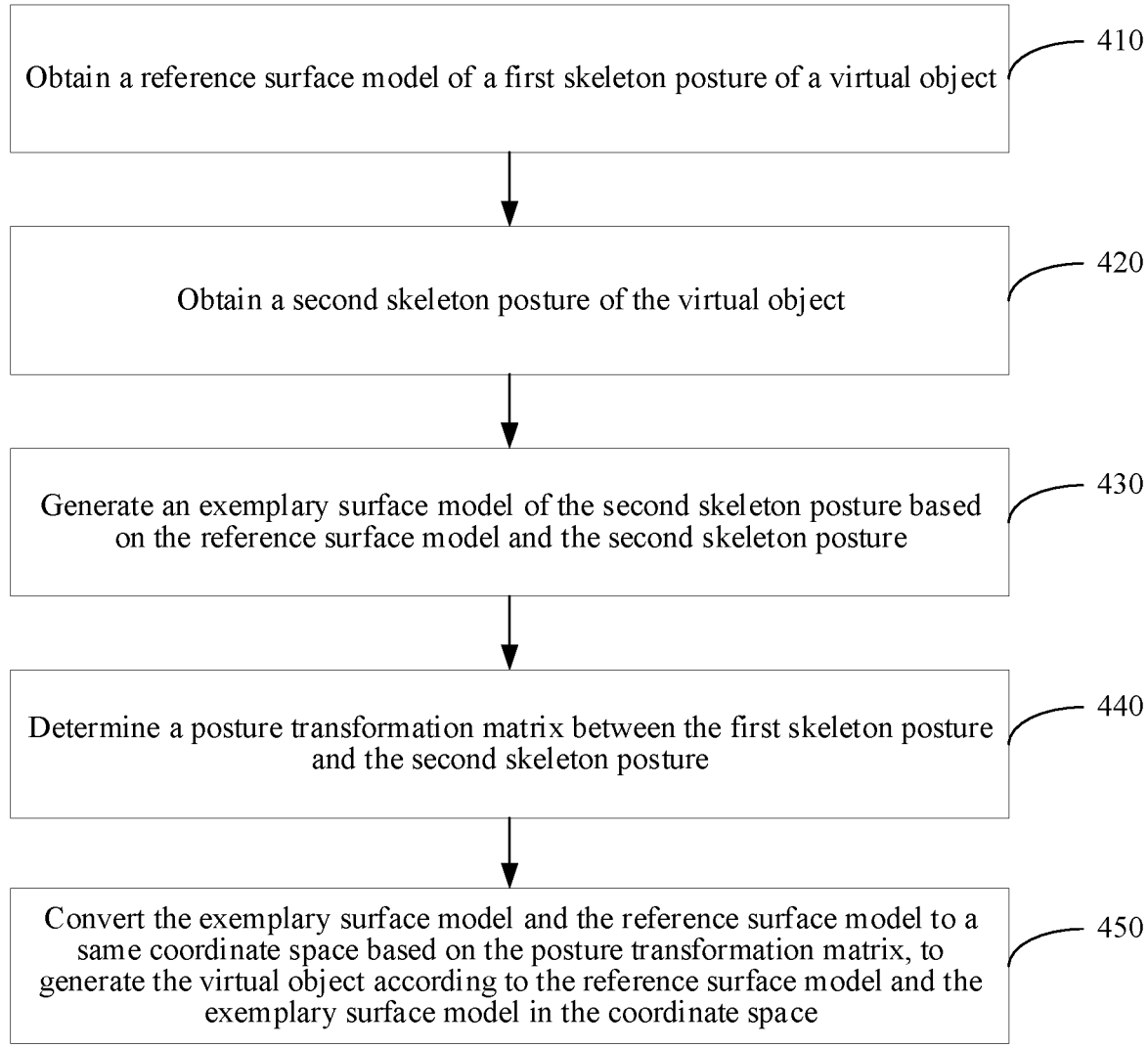
FIG. 3A is a flowchart of an image processing method according to an embodiment of this disclosure.

FIG. 3A is a schematic flowchart of an image processing method according to an embodiment of this disclosure. Steps shown in FIG. 3A are combined for description.

Step 410. Obtain a reference surface model of a first skeleton posture of a virtual object.

Step 420. Obtain a second skeleton posture of the virtual object.

Step 430. Generate an exemplary surface model of the second skeleton posture based on the reference surface model and the second skeleton posture.

Step 440. Determine a posture transformation matrix between the first skeleton posture and the second skeleton posture.

Step 450. Convert the exemplary surface model and the reference surface model to a same coordinate space based on the posture transformation matrix, to generate the virtual object according to the reference surface model and the exemplary surface model in the coordinate space.

In this embodiment of this disclosure, at a material resource generation stage, after generating an exemplary surface model according to a reference surface model, an electronic device converts the exemplary surface model and the reference surface model to a same coordinate space based on a posture transformation matrix between a first skeleton posture (a skeleton posture corresponding to the reference surface model) and a second skeleton posture (a skeleton posture corresponding to the exemplary surface model), to obtain a material resource in the same coordinate space. Therefore, during generation of the material resource, an impact of an additional surface deformation can be avoided, so that compatibility with the additional surface deformation (for example, various complex non-linear additional surface deformations) can be achieved at a subsequent virtual object generation stage, thereby effectively avoiding an uncontrollable result (for example, a finally generated virtual object does not match an applied surface deformation) caused by processing in different coordinate spaces and improving compatibility of a skeletal animation with the surface deformation.

A specific implementation process of the material resource generation stage is described below.

In step 410, the reference surface model of the first skeleton posture of the virtual object is obtained.

Herein, virtual objects refer to objects of various people and things that are virtualized. For example, the virtual object may be an animation character or may be a tree, a flag, paper, or the like. In this embodiment of this disclosure, the virtual object has a plurality of skeleton postures. For example, the animation character has a skeleton posture in a natural standing posture and a skeleton posture in a double-arm horizontal posture, and the flag has a skeleton posture in a static state and a skeleton posture when blown by the wind.

For a virtual object, a surface model of a first skeleton posture of the virtual object is obtained as a reference surface model. For example, the reference surface model may be a surface model of the virtual object in a natural standing posture, and the first skeleton posture is a skeleton posture of the virtual object in the natural standing posture. There may be only one first skeleton posture.

In this embodiment of this disclosure, the reference surface model may be generated in advance and stored in the electronic device. When a material resource needs to be generated, the electronic device may invoke the reference surface model. The reference surface model may alternatively be made by a user (for example, a modeler doing art work) on the electronic device (for example, a modeler terminal device) in real time. The first skeleton posture is similar to the reference surface model.

In step 420, the second skeleton posture of the virtual object is obtained.

The second skeleton posture is a skeleton posture of a to-be-generated exemplary surface model. The exemplary surface model is a surface model that is generated based on the reference surface model and is not of the first skeleton posture. For example, if the reference surface model is the surface model of the virtual object in the natural standing posture, a surface model, generated based on the surface model of the virtual object in the natural standing posture, of the virtual object in a double-arm horizontal posture is an exemplary surface model. Correspondingly, a skeleton posture of the virtual object in the double-arm horizontal posture is the second skeleton posture.

In this embodiment of this disclosure, the second skeleton posture may be generated in advance and stored in the electronic device. Alternatively, the second skeleton posture may be made by the user (for example, the modeler doing art work) on the electronic device in real time. A quantity of second skeleton postures is not limited in this embodiment of this disclosure, for example, there may be one or at least two second skeleton postures. For ease of understanding, in FIG. 3A, a case that there is only one second skeleton posture is used as an example for description.

In step 430, the exemplary surface model of the second skeleton posture is generated based on the reference surface model and the second skeleton posture.

A surface model of the second skeleton posture may be generated based on the obtained reference surface model and the obtained second skeleton posture. For ease of distinguishing, the surface model generated herein is named as the exemplary surface model.

In some embodiments, the generating an exemplary surface model of the second skeleton posture based on the reference surface model and the second skeleton posture may be implemented in this manner: performing skin processing on the reference surface model based on the second skeleton posture, to obtain an exemplary skeleton-skinning model of the second skeleton posture; and extracting surface data of the exemplary skeleton-skinning model, and generating the exemplary surface model of the second skeleton posture according to the surface data.

In this embodiment of this disclosure, skin processing is performed on the obtained reference surface model based on the obtained second skeleton posture, to obtain a skeleton-skinning model of the second skeleton posture. The skeleton-skinning model mainly includes two parts of information: surface data and skeleton-skinning information. For ease of distinguishing, the skeleton-skinning model obtained herein is named as an exemplary skeleton-skinning model.

For example, the reference surface model is a horizontal arm model with a horizontal posture, and the second skeleton posture is an upward arm skeleton posture with an upward posture. Skin processing is performed on the horizontal arm model based on the upward arm skeleton posture, to obtain an upward arm model with skeleton-skinning information and an upward posture, that is, the exemplary skeleton-skinning model.

After the exemplary skeleton-skinning model of the second skeleton posture is obtained, surface data of the exemplary skeleton-skinning model is extracted, so that the exemplary surface model of the second skeleton posture may be generated according to the surface data. The exemplary surface model includes vertices on a surface of the virtual object that are described by the extracted surface data. Through the skin processing, the exemplary surface model of the second skeleton posture can be automatically obtained, to reduce labor costs.

This embodiment is only an exemplary description, and does not limit the function and scope of this disclosure.

In some embodiments, before the extracting surface data of the exemplary skeleton-skinning model, the method further includes:

obtaining a modification request for the exemplary skeleton-skinning model from a requester; and opening a modification permission of the exemplary skeleton-skinning model to the requester if verification on the modification request succeeds, so that the requester modifies the exemplary skeleton-skinning model.

The extracting surface data of the exemplary skeleton-skinning model may be implemented in this manner: extracting surface data of a modified exemplary skeleton-skinning model.

In this embodiment of this disclosure, after skin processing is performed on the reference surface model to obtain the exemplary skeleton-skinning model and before the surface data of the exemplary skeleton-skinning model is extracted to obtain the exemplary surface model, a requester (for example, a modeler terminal device located in a front end) may be allowed to modify the exemplary skeleton-skinning model.

The skin processing is a linear mathematical processing process. Therefore, the exemplary skeleton-skinning model obtained through skin processing has only a simple change in a skeleton posture, and the surface data of the exemplary skeleton-skinning model cannot meet actual requirements such as a specific art requirement. For example, skin processing is performed on a horizontal arm model (a surface model) based on an elbow bending skeleton posture, and a bent arm model (a skeleton-skinning model) with skeleton-skinning information and an elbow bending posture can be obtained. The surface of the bicep in the horizontal arm model is relatively flat, and the surface of the bicep in the bent arm model obtained through skin processing does not change obviously and is still relatively flat. It may be understood that in real life, the elbow is bent to squeeze the muscle, and compared with the horizontal arm model, the surface of the bicep in the bent arm model has an obvious hump. If there is a specific art requirement, a more obvious hump is further required for the surface of the bicep in the bent arm model.

Therefore, after the skin processing, the requester may be supported in modifying the exemplary skeleton-skinning model, to meet a corresponding requirement, for example, an art requirement. For example, a user sends a modification request for the exemplary skeleton-skinning model through the requester to the electronic device (for example, a server), and when verification on the received modification request succeeds, the electronic device opens a corresponding modification permission to the requester, so that the user can modify the exemplary skeleton-skinning model at the requester.

A game scene is used as an example. A modeler sends a modification request to a game server by using a modeler terminal device and according to an art requirement, to request to modify the exemplary skeleton-skinning model obtained through the skin processing. When verification on the modification request succeeds, the game server opens a corresponding modification permission to the modeler terminal device. Therefore, the modeler can modify the exemplary skeleton-skinning model on the modeler terminal device.

When modifying the exemplary skeleton-skinning model at the requester, the user may modify the surface data of the exemplary skeleton-skinning model; or may modify the second skeleton posture corresponding to the exemplary skeleton-skinning model, to update the surface data of the exemplary skeleton-skinning model.

After modification is completed, the user may send a message indicating that modification is completed to the electronic device through the requester, and when receiving the message indicating that modification is completed, the electronic device extracts surface data of a modified exemplary skeleton-skinning model, to generate the exemplary surface model of the second skeleton posture according to the surface data. By means of combining a manual modification manner, accuracy of the surface data of the exemplary skeleton-skinning model can be improved, to meet various requirements in an actual application scenario.

This embodiment is only an exemplary description, and does not limit the function and scope of this disclosure.

In step 440, the posture transformation matrix between the first skeleton posture and the second skeleton posture is determined.

The posture transformation matrix is a mathematical matrix used for describing a mutual transformation relationship between the first skeleton posture and the second skeleton posture. Through the posture transformation matrix, the first skeleton posture may be transformed to the second skeleton posture, or the second skeleton posture may be transformed to the first skeleton posture.

In this embodiment of this disclosure, both the first skeleton posture and the second skeleton posture are present in the form of specific data in the electronic device. For example, the electronic device may store three-dimensional space coordinates of skeleton vertices. A corresponding skeleton posture may be obtained by adjusting the three-dimensional space coordinates of the skeleton vertices, that is, the skeleton posture may be stored and processed in the form of three-dimensional space coordinate data. A skeleton posture usually includes a plurality of skeleton vertices, and orientations and positions of bones in the skeleton posture may be represented by using the plurality of skeleton vertices. Therefore, the first skeleton posture may be represented as a mathematical matrix A, the second skeleton posture may be represented as a mathematical matrix B, and a matrix C may be obtained through calculation according to a formula of A*B=C, that is, a posture transformation matrix.

In step 450, the exemplary surface model and the reference surface model are converted to the same coordinate space based on the posture transformation matrix, to generate the virtual object according to the reference surface model and the exemplary surface model in the coordinate space.

In this embodiment of this disclosure, a generated material resource is converted to the same coordinate space, to facilitate generation of the virtual object. That is, at the material resource generation stage, the exemplary surface model and the reference surface model are converted to the same coordinate space. For example, the exemplary surface model may be converted to a coordinate space in which the reference surface model is located, or the reference surface model may be converted to a coordinate space in which the exemplary surface model is located.

In some embodiments, the converting the exemplary surface model and the reference surface model to a same coordinate space based on the posture transformation matrix may be implemented in this manner: performing coordinate transformation on the exemplary surface model according to the posture transformation matrix, to convert the exemplary surface model to the coordinate space in which the reference surface model is located.

In this embodiment of this disclosure, the reference surface model is a manually set standard. Therefore, coordinate transformation may be performed on the exemplary surface model according to the posture transformation matrix, to convert the exemplary surface model to the coordinate space in which the reference surface model is located. Further, the reference surface model and the exemplary surface model may be stored in the coordinate space in which the reference surface model is located, to generate the material resource.

Figure 4:
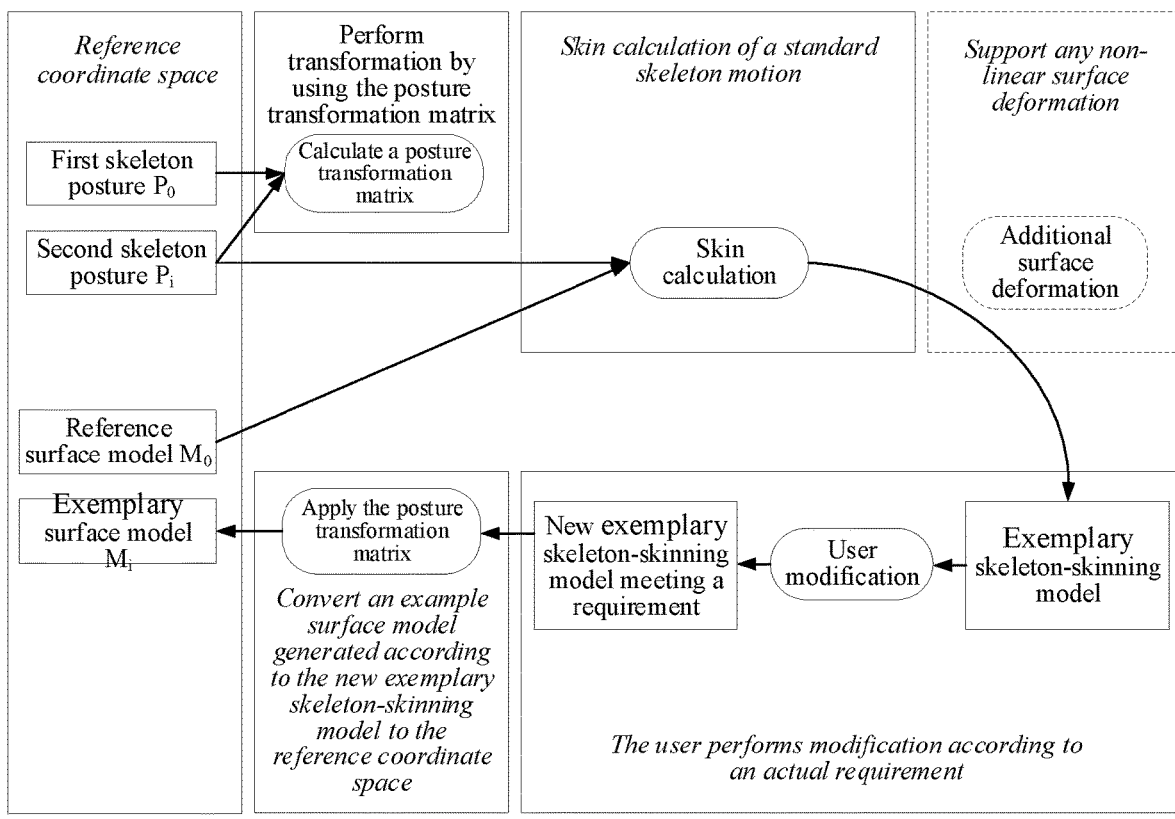
FIG. 4 is a flowchart of a material resource generation stage according to an embodiment of this disclosure.

Referring to FIG. 4, a process of a material resource generation stage in an embodiment of this disclosure is described below.

As shown in FIG. 4, a reference surface model $M_0$ is located in a coordinate space. For ease of distinguishing, the coordinate space is named as a reference coordinate space. Data initially obtained by the electronic device includes the reference surface model $M_0$, a first skeleton posture $P_0$ corresponding to the reference surface model $M_0$, and a second skeleton posture $P_i$ corresponding to a to-be-generated exemplary surface model $M_i$.

A posture transformation matrix between the first skeleton posture $P_0$ and the second skeleton posture $P_i$ is calculated, so that transformation of the coordinate space is performed by using the posture transformation matrix subsequently.

Skin processing is performed on the reference surface model $M_0$ according to the second skeleton posture $P_i$, to obtain an exemplary skeleton-skinning model, and then a user (for example, a modeler) may modify the exemplary skeleton-skinning model according to an actual requirement (for example, an art requirement), to obtain a new exemplary skeleton-skinning model (that is, a modified exemplary skeleton-skinning model) meeting the requirement. Surface data of the new exemplary skeleton-skinning model is extracted, to generate an exemplary surface model of the second skeleton posture $P_i$, and then the exemplary surface model is converted to the reference coordinate space by using the posture transformation matrix, to obtain the exemplary surface model $M_i$ located in the reference coordinate space.

In this embodiment of this disclosure, the electronic device stores both the reference surface model $M_0$ and the exemplary surface model $M_i$ in the reference coordinate space by using the posture transformation matrix, so that in a subsequent virtual object generation process, a series of processing on the reference surface model $M_0$ and the exemplary surface model $M_i$ are all performed in the reference coordinate space, to avoid the impact of the surface deformation. Therefore, the generated material resource, that is, the reference surface model $M_0$ and the exemplary surface model $M_i$ can be compatible with any additional surface deformation, for example, various complex non-linear additional surface deformations, thereby effectively avoiding an uncontrollable result caused by processing in different coordinate spaces, for example, a finally generated virtual object does not match an applied surface deformation.

This embodiment is only an exemplary description, and does not limit the function and scope of this disclosure.

Figure 3B:
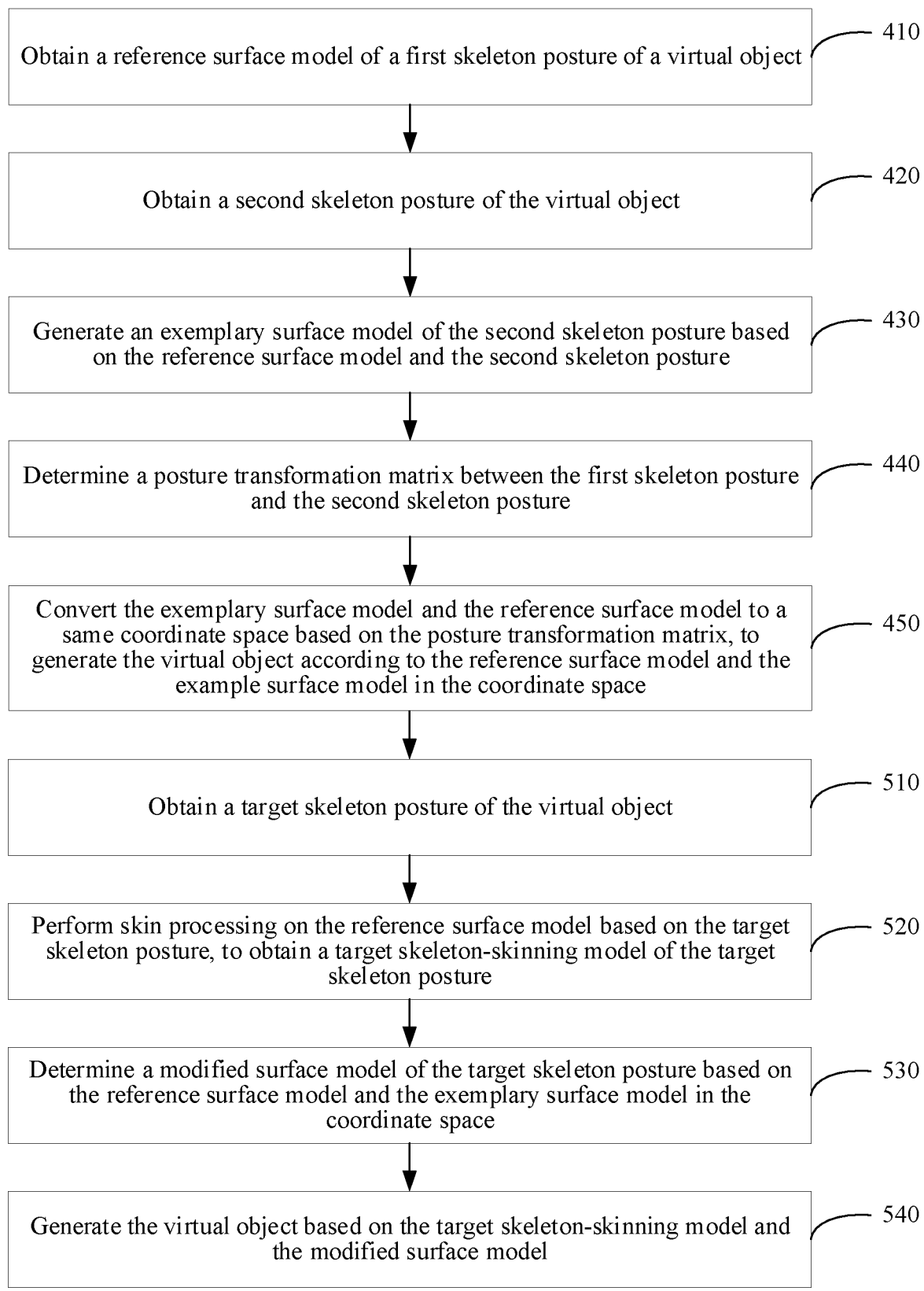
FIG. 3B is a flowchart of an image processing method according to an embodiment of this disclosure.

In some embodiments, FIG. 3B is a schematic flowchart of an image processing method according to an embodiment of this disclosure. Based on FIG. 3A, after step 450, in step 510, a target skeleton posture of the virtual object may be further obtained.

Herein, the target skeleton posture is a skeleton posture of a virtual object that needs to be generated and may be set according to an actual application scenario. For example, if the target skeleton posture is a skeleton posture in a standing posture with hands on hips, a finally generated virtual object is in the standing posture with hands on hips. In this embodiment of this disclosure, the target skeleton posture may be generated in advance and stored in the electronic device, or may be obtained in real time.

In some embodiments, the obtaining a target skeleton posture of the virtual object may be implemented in this manner: obtaining manipulation data for the virtual object; and determining the target skeleton posture of the virtual object based on the manipulation data.

In this embodiment of this disclosure, the target skeleton posture may be determined by using manipulation data for the virtual object, for example, based on the manipulation data inputted by a specific input device. For example, the manipulation data may be from an input device in the second terminal device 30 in FIG. 1 or from an input device in the game player terminal device 60 in FIG. 2. The manipulation data may include at least one of keyboard data, mouse data, or screen touch data, and is certainly not limited thereto.

A game scene is used as an example for description. A player may perform a screen touch operation on a mobile phone terminal, to instruct a game character in a game run in the mobile phone terminal to make a corresponding action in a specific posture. When detecting the screen touch operation, the mobile phone terminal uploads screen touch data triggered by the screen touch operation to a game server, and the game server determines, based on the obtained screen touch data, the specific posture indicated by the player, that is, a target skeleton posture of the game character. In this manner, the user can determine the target skeleton posture through active manipulation, to control generation of the virtual object.

This embodiment is only an exemplary description, and does not limit the function and scope of this disclosure.

In some embodiments, the obtaining a target skeleton posture of the virtual object may be implemented in this manner: obtaining sensor data; determining a user action based on the sensor data; and determining the target skeleton posture of the virtual object based on the user action.

In this embodiment of this disclosure, the target skeleton posture of the virtual object may be further determined by using sensor data. The sensor data may be from a sensor device, for example, a sensor device in the second terminal device 30 in FIG. 1 or a sensor device in the game player terminal device 60 in FIG. 2. The sensor data may include at least one of positioning sensor data related to positioning information or action sensor data related to local body movement.

A game scene is used as an example for description, a player wears a virtual reality (VR) device such as VR glasses or a VR handle communicating with a computer terminal and makes a specific action to instruct a corresponding game character in a VR game run in the computer terminal to make the same action. A VR sensor system (for example, a sensor system formed by at least two base stations) corresponding to the VR device may generate corresponding sensor data by monitoring a sensor in the VR device (for example, a sensor in the VR handle) and send the sensor data to the computer terminal. After the computer terminal uploads the sensor data to a server, the server may determine a user action according to the sensor data (that is, implementing action capture) and use a skeleton posture corresponding to the determined user action as a target skeleton posture of the game character. In this manner, the user determines the target skeleton posture by making an action, and a stronger immersed sense can be brought to the user, to improve interaction experience of the user.

This embodiment is only an exemplary description, and does not limit the function and scope of this disclosure. In addition, the manner of determining the target skeleton posture of the virtual object is also applicable to determining of the first skeleton posture and the second skeleton posture of the virtual object.

Step 520. Perform skin processing on the reference surface model based on the target skeleton posture, to obtain a target skeleton-skinning model of the target skeleton posture.

After the target skeleton posture is obtained, skin processing is performed on the reference surface model based on the target skeleton posture, to obtain a skeleton-skinning model of the target skeleton posture. For ease of distinguishing, the skeleton-skinning model obtained herein is named as a target skeleton-skinning model.

Step 530. Determine a modified surface model of the target skeleton posture based on the reference surface model and the exemplary surface model in the coordinate space.

Herein, the modified surface model of the target skeleton posture is determined based on the reference surface model and the exemplary surface model in the same coordinate space. The modified surface model is a surface model that can perform a certain degree of modification on surface data of the target skeleton-skinning model, to meet an actual requirement (for example, an art requirement) to a certain extent. A skeleton posture corresponding to the modified surface model is basically consistent with a skeleton posture corresponding to the target skeleton-skinning model, that is, the target skeleton posture.

In some embodiments, a surface model (that is, the modified surface model) of the target skeleton posture generated based on a pre-generated material resource belonging to a specific art style also belongs to the art style. Therefore, a consistent style of virtual objects generated based on different target skeleton postures can be ensured, and the uniformity is improved.

In some embodiments, the determining a modified surface model of the target skeleton posture based on the reference surface model and the exemplary surface model in the coordinate space may be implemented in this manner: determining, if the first skeleton posture and the second skeleton posture are fused into the target skeleton posture, weights respectively allocated to the first skeleton posture and the second skeleton posture; and fusing the reference surface model and the exemplary surface model based on the weight of the first skeleton posture and the weight of the second skeleton posture, to obtain the modified surface model of the target skeleton posture.

Herein, weights respectively allocated to the first skeleton posture and the second skeleton posture are determined. The first skeleton posture and the second skeleton posture can be fused into the target skeleton posture according to the weights respectively allocated to the first skeleton posture and the second skeleton posture. The fusion may be weighted summation or certainly may be another manner. Further, the reference surface model of the first skeleton posture and the exemplary surface model of the second skeleton posture are fused based on the weight of the first skeleton posture and the weight of the second skeleton posture, to obtain the modified surface model of the target skeleton posture.

In some embodiments, the determining, if the first skeleton posture and the second skeleton posture are fused into the target skeleton posture, weights respectively allocated to the first skeleton posture and the second skeleton posture may be implemented in this manner: if the first skeleton posture and the second skeleton posture are fused into the target skeleton posture, performing interpolation processing between the first skeleton posture and the second skeleton posture by using a radial basis function, to obtain the weights respectively allocated to the first skeleton posture and the second skeleton posture.

Herein, when the first skeleton posture and the second skeleton posture are fused into the target skeleton posture, a radial basis function (RBF) may be used. Interpolation processing is performed between the first skeleton posture and the second skeleton posture that are stored, to obtain the weights respectively allocated to the first skeleton posture and the second skeleton posture.

In some embodiments, the fusing the reference surface model and the exemplary surface model based on the weight of the first skeleton posture and the weight of the second skeleton posture, to obtain the modified surface model of the target skeleton posture may be implemented in this manner: performing weighting processing on the reference surface model and the exemplary surface model by using the weight of the first skeleton posture as a weight of the reference surface model and using the weight of the second skeleton posture as a weight of the exemplary surface model, to obtain the modified surface model of the target skeleton posture.

Herein, the modified surface model of the target skeleton posture may be obtained by weighted summation. For example, when a first skeleton posture $P_0$ and a second skeleton posture $P_1$ are fused into a target skeleton posture P, a weight allocated to $P_0$ is $W_0$, and a weight allocated to $P_1$ is $W_1$. Further, a reference surface model $M_0$ of the first skeleton posture $P_0$ and an exemplary surface model $M_1$ of the second skeleton posture $P_1$ are fused according to $W_0$ and $W_1$, to obtain a modified surface model M, $M=W_0*M_0+W_1*M_1$ This embodiment is only an exemplary description, and does not limit the function and scope of this disclosure. In addition to the weighted summation, the reference surface model and the exemplary surface model may be further fused in another manner.

Step 540. Generate the virtual object based on the target skeleton-skinning model and the modified surface model.

In some embodiments, the generating the virtual object based on the target skeleton-skinning model and the modified surface model may be implemented in this manner: determining a posture transformation matrix between the first skeleton posture and the target skeleton posture as a target posture transformation matrix; performing coordinate transformation on the modified surface model in the coordinate space based on the target posture transformation matrix, to obtain the extracted modified surface model; and superimposing the extracted modified surface model and the target skeleton-skinning model, to generate the virtual object.

In this embodiment of this disclosure, the reference surface model and the exemplary surface model that are stored are located in the same coordinate space, and the modified surface model is obtained by fusing the reference surface model and the exemplary surface model. Therefore, the modified surface model is also located in the coordinate space. When the target skeleton posture is different from the first skeleton posture, the modified surface model needs to be extracted from the coordinate space, to meet a coordinate space corresponding to the target skeleton posture. For example, a posture transformation matrix between the first skeleton posture and the target skeleton posture is determined. For ease of distinguishing, the posture transformation matrix determined herein is named as a target posture transformation matrix. Coordinate transformation is performed on the modified surface model in the coordinate space based on the obtained target posture transformation matrix, to obtain the extracted modified surface model, and then the extracted modified surface model and the target skeleton-skinning model are superimposed, to generate the virtual object. In this manner, the extracted modified surface model can be located in the coordinate space corresponding to the target skeleton posture, facilitating generation of the virtual object.

This embodiment is only an exemplary description, and does not limit the function and scope of this disclosure.

In some embodiments, before the superimposing the extracted modified surface model and the target skeleton-skinning model, the method further includes: performing surface deformation processing on the target skeleton-skinning model. the superimposing the extracted modified surface model and the target skeleton-skinning model, to generate the virtual object may be implemented in this manner: superimposing the extracted modified surface model and the target skeleton-skinning model obtained after the surface deformation processing, to generate the virtual object.

In this embodiment of this disclosure, after skin processing is performed on the reference surface model based on the target skeleton posture, to obtain the target skeleton-skinning model, surface deformation processing may be performed on the target skeleton-skinning model according to an actual requirement, for example, various complex non-linear additional surface deformations are applied. The surface deformation may be generated based on a third party system. For example, after the target skeleton-skinning model is generated, a third-party muscle simulation system is invoked, to apply a muscle in a specific form to the target skeleton-skinning model.

After the modified surface model obtained through fusion is extracted from the coordinate space in which the reference surface model is located, the extracted modified surface model and the target skeleton-skinning model to which an additional surface deformation (that is, after the surface deformation processing) has been added may be superimposed, to generate the virtual object. In this manner, various surface deformation requirements can be met, to improve the applicability to the actual application scenario.

This embodiment is only an exemplary description, and does not limit the function and scope of this disclosure.

In some embodiments, after step 540, the method further includes: rendering the generated virtual object, to display the virtual object in a virtual scene.

Herein, when the electronic device used for generating the virtual object is the terminal device, the terminal device may render the generated virtual object locally, to display the virtual object in a virtual scene. When the electronic device used for generating the virtual object is the server, the server may send rendering data for the generated virtual object to the terminal device, and the terminal device may perform rendering according to the received rendering data, to display the virtual object in the virtual scene. The virtual scene may also be obtained through rendering. In this manner, the flexibility of displaying the virtual object is improved.

As shown in FIG. 3B, both the reference surface model and the exemplary surface model are located in the same independent coordinate space constructed by using the posture transformation matrix. Therefore, processing on both the reference surface model and the exemplary surface model is performed in the coordinate space without being affected by a surface deformation, so that compatibility with any non-linear surface deformation can be achieved at the virtual object generation stage, to improve the compatibility with the surface deformation.

Figure 3C:
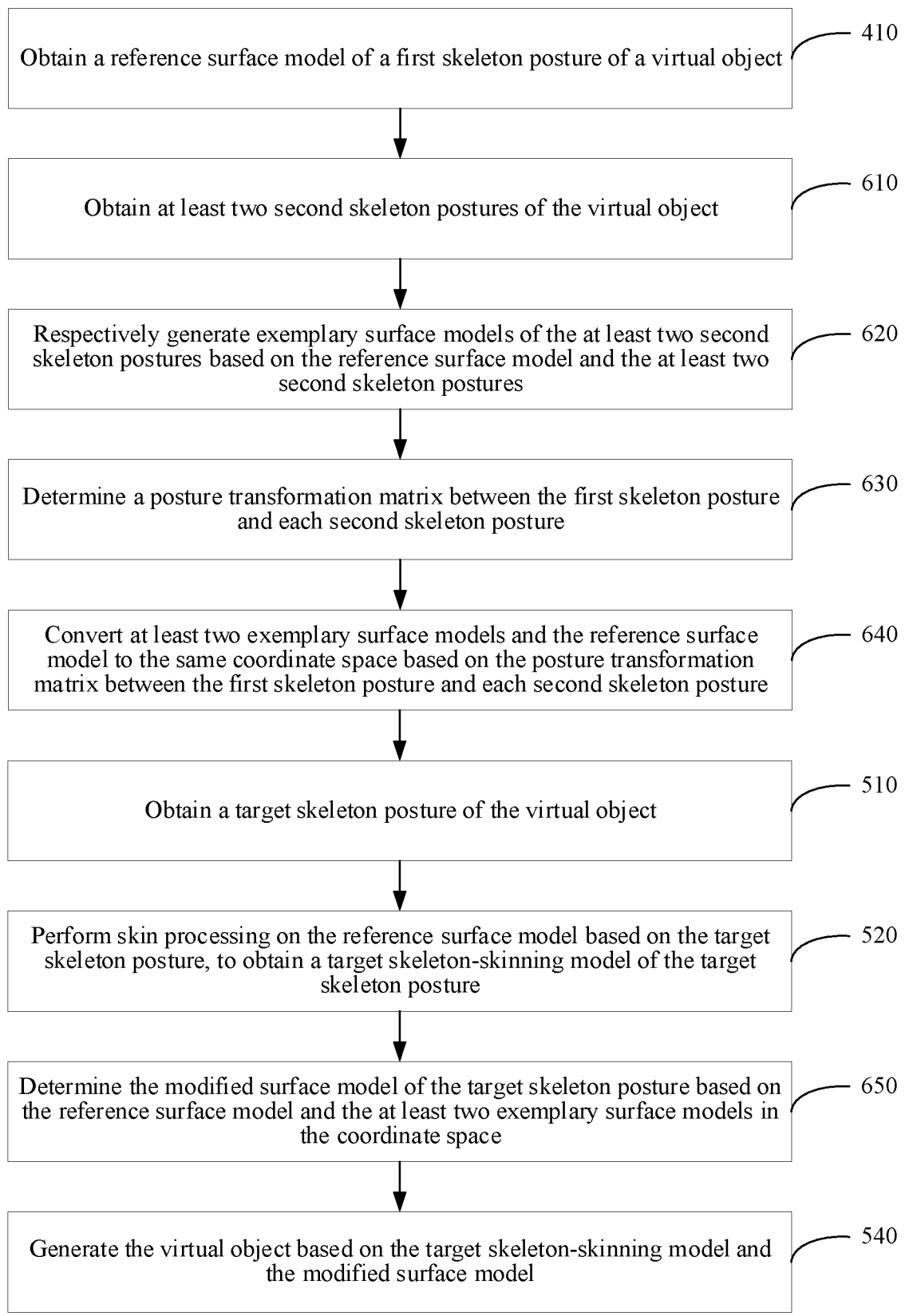
FIG. 3C is a flowchart of an image processing method according to an embodiment of this disclosure.

In some embodiments, FIG. 3C is a schematic flowchart of an image processing method according to an embodiment of this disclosure. Step 420 shown in FIG. 3B may be updated as step 610. Step 610. Obtain at least two second skeleton postures of the virtual object.

In this embodiment of this disclosure, at the material resource generation stage, only one exemplary surface model may be generated, so that the virtual object is generated based on the reference surface model and the exemplary surface model. Alternatively, at least two exemplary surface models may be generated, so that the virtual object is generated based on the reference surface model and the at least two exemplary surface models. Herein, the latter case is used as an example for description. First, at least two second skeleton postures of the virtual object are obtained. For ease of understanding, a case that an obtained first skeleton posture is $P_0$, a reference surface model is $M_0$, and obtained second skeleton postures include $P_1$, $P_2$, and $P_3$ is used as an example for description.

In FIG. 3C, step 430 shown in FIG. 3B may be updated as step 620. Step 620. Respectively generate exemplary surface models of the at least two second skeleton postures based on the reference surface model and the at least two second skeleton postures.

An exemplary surface model of each of the obtained second skeleton postures is generated based on the reference surface model and the second skeleton posture. Therefore, an exemplary surface model corresponding to each second skeleton posture may be obtained. For example, an exemplary surface model $M_1$ of the second skeleton posture $P_1$, an exemplary surface model $M_2$ of the second skeleton posture $P_2$, and an exemplary surface model $M_3$ of the second skeleton posture $P_3$ may be obtained.

In FIG. 3C, step 440 shown in FIG. 3B may be updated as step 630. Step 630. Determine a posture transformation matrix between the first skeleton posture and each second skeleton posture.

A posture transformation matrix between the first skeleton posture and each second skeleton posture is further determined.

In FIG. 3C, step 450 shown in FIG. 3B may be updated as step 640. Step 640. Convert at least two exemplary surface models and the reference surface model to the same coordinate space based on the posture transformation matrix between the first skeleton posture and each second skeleton posture.

Herein, the second skeleton posture $P_1$ is used as an example. The exemplary surface model $M_1$ of the second skeleton posture $P_1$ may be converted to the coordinate space in which the reference surface model $M_0$ is located based on a posture transformation matrix between the first skeleton posture $P_0$ and the second skeleton posture $P_1$, and so on.

In FIG. 3C, step 530 shown in FIG. 3B may be applied as step 650. Step 650. Determine the modified surface model of the target skeleton posture based on the reference surface model and the at least two exemplary surface models in the coordinate space.

In this embodiment of this disclosure, the generated material resource includes at least two exemplary surface models. Correspondingly, when the modified surface model is determined according to the generated material resource, the electronic device determines the modified surface model according to all the exemplary surface models and the reference surface model that are stored.

For example, when the first skeleton posture $P_0$, the second skeleton posture $P_1$, the second skeleton posture $P_2$, and the second skeleton posture $P_3$ are fused into the target skeleton posture P, a weight $W_0$ allocated to $P_0$, a weight $W_1$ allocated to $P_1$, a weight $W_2$ allocated to $P_2$, and a weight $W_3$ allocated to $P_3$ may be determined. Further, $M_0$, $M_1$, $M_2$, and $M_3$ are fused according to $W_0$, $W_1$, $W_2$, and $W_3$, to obtain a modified surface model M. The modified surface model M may be obtained through $W_0*M_0+W_1*M_1+W_2*M_2+W_3*M_3=M$.

As shown in FIG. 3C, in this embodiment of this disclosure, a material resource and a virtual object may be generated by using at least two second skeleton postures. As a quantity of second skeleton postures increases, an effect of the generated virtual object is also better.

Figure 5:
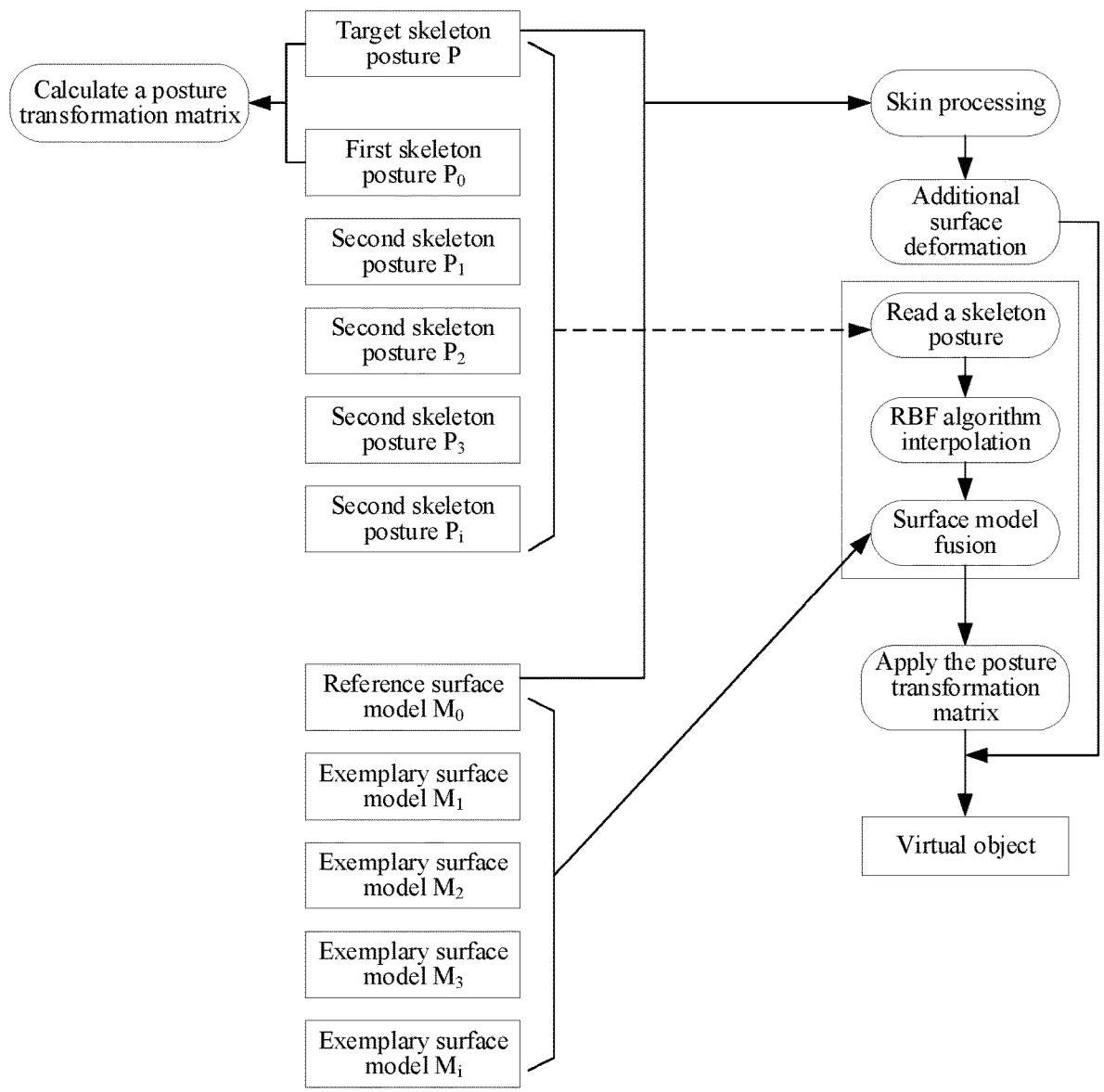
FIG. 5 is a flowchart of a virtual object generation stage according to an embodiment of this disclosure.

Referring to FIG. 5, a process of a virtual object generation stage in an embodiment of this disclosure is described below.

As shown in FIG. 5, a pre-generated material resource (which is stored in a reference coordinate space) includes a reference surface model $M_0$, an exemplary surface model $M_1$, an exemplary surface model $M_2$, an exemplary surface model $M_3$, . . . , and an exemplary surface model $M_i$, i being an integer greater than 3. Correspondingly, obtained skeleton postures include a first skeleton posture $P_0$ of the reference surface model $M_0$, a second skeleton posture $P_1$ of the exemplary surface model $M_1$, a second skeleton posture $P_2$ of the exemplary surface model $M_2$, a second skeleton posture $P_3$ of the exemplary surface model $M_3$, . . . , and a second skeleton posture $P_i$ of the exemplary surface model $M_i$.

When a target skeleton posture P is obtained, a posture transformation matrix between the target skeleton posture P and the first skeleton posture $P_0$ is calculated, to perform transformation of a coordinate space by using the posture transformation matrix subsequently.

Skin processing is performed on the reference surface model $M_0$ according to the target skeleton posture P, to obtain a target skeleton-skinning model. Further, surface deformation processing may be performed by using a third-party system and based on the target skeleton-skinning model, that is, an additional surface deformation is applied. For example, a muscle in a specific form is applied by using a third-party muscle simulation system.

The stored skeleton postures, including the first skeleton posture $P_0$, the second skeleton posture $P_1$, the second skeleton posture $P_2$, the second skeleton posture $P_3$, . . . , and the second skeleton posture $P_i$ are read. Interpolation processing is performed among the read skeleton postures by using an RBF algorithm, to obtain weights that need to be allocated to the read skeleton postures when all the read skeleton postures are fused into the target skeleton posture P. Further, surface models corresponding to the read skeleton postures are fused according to the allocated weights, to obtain a modified surface model stored in the reference coordinate space.

Coordinate transformation is performed, by using the posture transformation matrix, on the modified surface model stored in the reference coordinate space, to extract the modified surface model from the reference coordinate space, and then the extracted modified surface model and the target skeleton-skinning model obtained after the skin processing and to which an additional surface deformation has been applied are superimposed, to obtain a corresponding virtual object.

This embodiment is only an exemplary description, and does not limit the function and scope of this disclosure.

Figure 6:
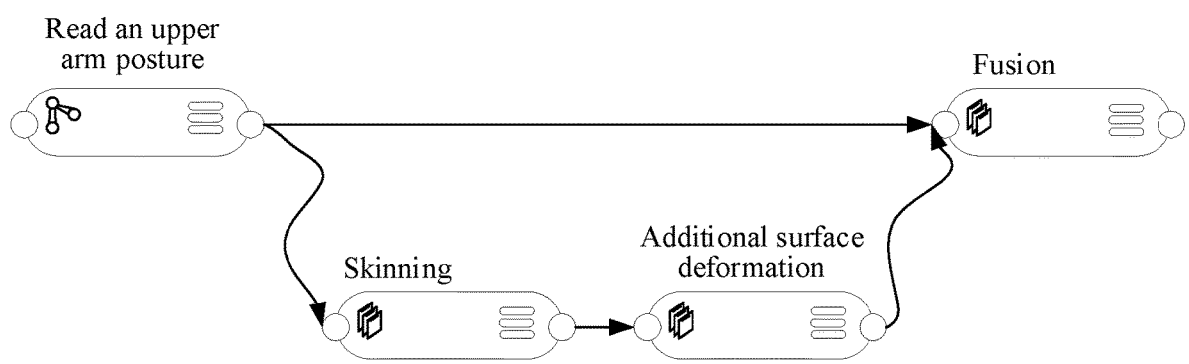
FIG. 6 is a diagram of a terminal interface in which a virtual object is generated in Maya software according to an embodiment of this disclosure.

FIG. 6 is a diagram of a terminal interface in which an image processing method is applicable to Maya software (three-dimensional modeling software), to generate a virtual object according to an embodiment of this disclosure.

In FIG. 6, a pre-generated material resource may be upper arm surface models of skeleton postures generated for an upper arm of a virtual object. In the diagram of the terminal interface of the Maya software shown in this embodiment of this disclosure, there are four nodes integrated with corresponding functions: an upper-arm posture read node (upperarm_r node), a skinning node (skinCluster node), an additional surface deformation node (deformate node), and a fusion node (posedriver node). The upperarm_r node is mainly used for reading the upper arm surface models of the skeleton postures in the material resource. The shinCluster node is mainly used for performing skin processing. The deformate node is mainly used for applying an additional surface deformation, that is, performing surface deformation processing. The posedriver node is mainly used for fusing the surface models, to generate a modified surface model. Calculation and application of a posture transformation matrix may be encapsulated into the posedriver node.

In the related art, a generated material resource cannot support compatibility with an additional surface deformation at a virtual object generation stage. Therefore, at the virtual object generation stage, the skinCluster node used for performing skin processing can be placed only after the posedriver node mainly used for fusing the surface models. In addition, in the related art, the deformate node used for applying the additional surface deformation cannot be directly placed between the skinCluster node and the posedriver node. According to the image processing method provided in this embodiment of this disclosure, the modified surface model obtained by using the posedriver node can be compatible with any non-linear additional surface deformation, so that after coordinate transformation is performed by using a posture transformation matrix, the modified surface model can be directly superimposed onto a skeleton-skinning model on which skin processing has been performed and an additional surface deformation has been applied.

This embodiment is only an exemplary description, and does not limit the function and scope of this disclosure.

Figure 7:
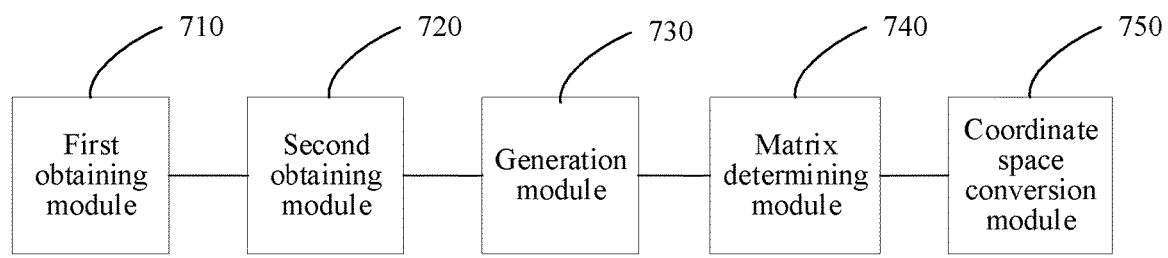
FIG. 7 is a block diagram of an image processing apparatus according to an embodiment of this disclosure.

As shown in FIG. 7, an embodiment of this disclosure further provides an image processing apparatus, including: a first obtaining module 710, configured to obtain a reference surface model of a first skeleton posture of a virtual object; a second obtaining module 720, configured to obtain a second skeleton posture of the virtual object; a generation module 730, configured to generate an exemplary surface model of the second skeleton posture based on the reference surface model and the second skeleton posture; a matrix determining module 740, configured to determine a posture transformation matrix between the first skeleton posture and the second skeleton posture; and a coordinate space converting module 750, configured to convert the exemplary surface model and the reference surface model to a same coordinate space based on the posture transformation matrix, to generate the virtual object according to the reference surface model and the exemplary surface model in the coordinate space.

In some embodiments, the generation module 730 is configured to perform skin processing on the reference surface model based on the second skeleton posture, to obtain an exemplary skeleton-skinning model of the second skeleton posture; and extract surface data of the exemplary skeleton-skinning model, and generate the exemplary surface model of the second skeleton posture according to the surface data.

In some embodiments, the image processing apparatus is configured to: obtain a modification request for the exemplary skeleton-skinning model from a requester; and open a modification permission of the exemplary skeleton-skinning model to the requester if verification on the modification request succeeds, so that the requester modifies the exemplary skeleton-skinning model; and extract surface data of a modified exemplary skeleton-skinning model.

In some embodiments, the coordinate space converting module 750 is configured to: perform coordinate transformation on the exemplary surface model according to the posture transformation matrix, to convert the exemplary surface model to the coordinate space in which the reference surface model is located.

The term module (and other similar terms such as unit, submodule, subunit, etc.) in this disclosure may refer to a software module, a hardware module, or a combination thereof A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In some embodiments, the image processing apparatus is configured to: obtain a target skeleton posture of the virtual object; perform skin processing on the reference surface model based on the target skeleton posture, to obtain a target skeleton-skinning model of the target skeleton posture; determine a modified surface model of the target skeleton posture based on the reference surface model and the exemplary surface model in the coordinate space; and generate the virtual object based on the target skeleton-skinning model and the modified surface model.

In some embodiments, the image processing apparatus is configured to: determine, if the first skeleton posture and the second skeleton posture are fused into the target skeleton posture, weights respectively allocated to the first skeleton posture and the second skeleton posture; and fuse the reference surface model and the exemplary surface model based on the weight of the first skeleton posture and the weight of the second skeleton posture, to obtain the modified surface model of the target skeleton posture.

In some embodiments, the image processing apparatus is configured to perform, if the first skeleton posture and the second skeleton posture are fused into the target skeleton posture, interpolation processing between the first skeleton posture and the second skeleton posture by using a radial basis function, to obtain the weights respectively allocated to the first skeleton posture and the second skeleton posture.

In some embodiments, the image processing apparatus is configured to perform weighting processing on the reference surface model and the exemplary surface model by using the weight of the first skeleton posture as a weight of the reference surface model and using the weight of the second skeleton posture as a weight of the exemplary surface model, to obtain the modified surface model of the target skeleton posture.

In some embodiments, the image processing apparatus is configured to: determine a posture transformation matrix between the first skeleton posture and the target skeleton posture as a target posture transformation matrix; perform coordinate transformation on the modified surface model in the coordinate space based on the target posture transformation matrix, to obtain the extracted modified surface model; and superimpose the extracted modified surface model and the target skeleton-skinning model, to generate the virtual object.

In some embodiments, the image processing apparatus is configured to: perform surface deformation processing on the target skeleton-skinning model; and superimpose the extracted modified surface model and the target skeleton-skinning model obtained after the surface deformation processing, to generate the virtual object.

In some embodiments, there are at least two second skeleton postures; and the image processing apparatus is configured to: respectively generate exemplary surface models of the at least two second skeleton postures based on the reference surface model and the at least two second skeleton postures; determine a posture transformation matrix between the first skeleton posture and each of the second skeleton postures; and convert at least two exemplary surface models and the reference surface model to the same coordinate space based on the posture transformation matrix between the first skeleton posture and each of the second skeleton postures.

In some embodiments, the image processing apparatus is configured to: obtain a target skeleton posture of the virtual object; perform skin processing on the reference surface model based on the target skeleton posture, to obtain the target skeleton-skinning model of the target skeleton posture; determine the modified surface model of the target skeleton posture based on the reference surface model and the at least two exemplary surface models in the coordinate space; and generate the virtual object based on the target skeleton-skinning model and the modified surface model.

In some embodiments, the image processing apparatus is configured to obtain manipulation data for the virtual object; and determine the target skeleton posture of the virtual object based on the manipulation data.

In some embodiments, the image processing apparatus is configured to: obtain sensor data; determine a user action based on the sensor data; and determine the target skeleton posture of the virtual object based on the user action.

In some embodiments, the image processing apparatus is configured to render the generated virtual object, to display the virtual object in a virtual scene.

Figure 8:
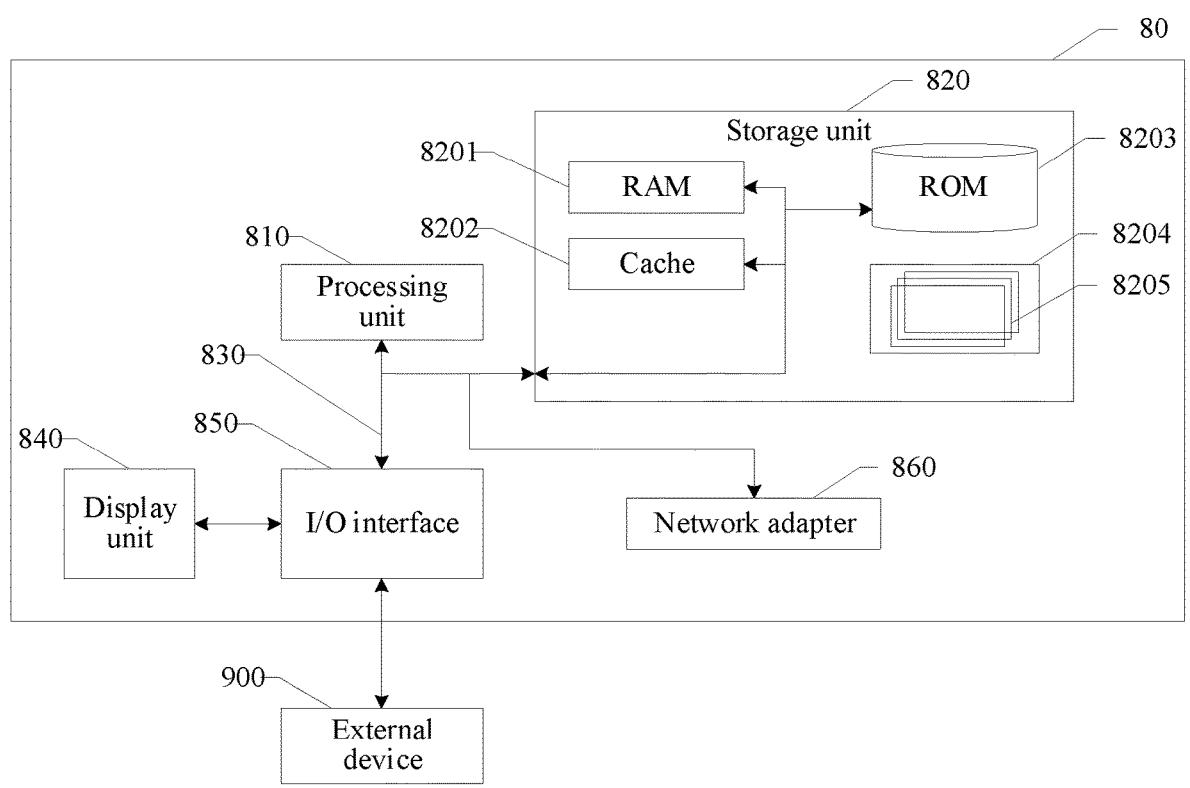
FIG. 8 is a hardware diagram of an electronic device according to an embodiment of this disclosure.

Referring to FIG. 8, an electronic device 80 is described below according to an embodiment of this disclosure. The electronic device 80 shown in FIG. 8 is only an example, and does not impose any restriction on functions and scopes of use of the embodiments of this disclosure.

As shown in FIG. 8, the electronic device 80 is represented in a form of a general-purpose computing device. Components of the electronic device 80 may include, but are not limited to: at least one processing unit 810, at least one storage unit 820, and a bus 830 connecting different system components (including the storage unit 820 and the processing unit 810).

The storage unit stores program code. The program code, when executed by the processing unit 810, may cause the processing unit 810 to perform the steps according to the exemplary implementations of this disclosure described in the exemplary methods in this specification. For example, the processing unit 810 may perform each step shown in FIG. 3A, FIG. 3B, and FIG. 3C.

The storage unit 820 may include a non-transitory readable medium in the form of a volatile storage unit, for example, a random access memory (RAM) unit 8201 and/or a cache storage unit 8202, and may further include a read-only memory (ROM) unit 8203.

The storage unit 820 may further include a program/utility tool 8204 having a group of (at least one) program modules 8205. Such a program module 8205 includes, but is not limited to, an operating system, one or more application programs, other program modules, and program data. Each or a combination of these examples may include implementation of a network environment.

The bus 830 may represent one or more of several types of bus structures, including a storage unit bus or a storage unit controller, a peripheral bus, an accelerated graphics port, a processing unit, or a local bus using any one of a plurality of bus structures.

The electronic device 80 may also communicate with one or more external devices 900 (for example, a keyboard, a pointing device, and a Bluetooth device), and may also communicate with one or more devices that enable a user to interact with the electronic device 80, and/or communicate with any device (for example, a router and a modem) that enables the electronic device 80 to communicate with one or more other computing devices. This communication may proceed through an input/output (I/O) interface 850. The I/O interface 850 is connected to a display unit 840. Moreover, the electronic device 80 may also communicate with one or more networks (for example, a local area network (LAN), a wide area network (WAN) and/or a public network such as the Internet) through a network adapter 860. As shown in the figure, the network adapter 860 may communicate with other modules of the electronic device 80 through the bus 830. It is to be understood that although not shown in the figure, other hardware and/or software modules may be used in conjunction with the electronic device 80, including, but not limited to, microcode, a device driver, a redundancy processing unit, an external magnetic disk driving array, a redundant array of independent disks (RAID) system, a magnetic tape drive, a data backup storage system, and the like.

Through descriptions of the foregoing implementations, it is easy for a person skilled in the art to understand that the exemplary implementations described herein can be implemented by software or by combining software with necessary hardware. Therefore, the technical solutions of the implementations of this disclosure may be implemented in a form of a software product. The software product may be stored in a non-volatile storage medium (which may be a compact disc read-only memory (CD-ROM), a USB flash drive, a removable hard disk, or the like) or in a network and includes several instructions for instructing a computing device (which may be a personal computer, a server, a terminal device, a network device, or the like) to perform the methods described in the implementations of this disclosure.

An exemplary embodiment of this disclosure further provides a computer-readable storage medium, storing computer-readable instructions, the computer-readable instructions, when executed by a processor, implementing the image processing method provided in the embodiments of this disclosure.

An embodiment of this disclosure further provides a program product for implementing the image processing method. The program product may use a portable CD-ROM and include program code, and may be run on a terminal device such as a personal computer. However, the program product of this disclosure is not limited to this. In this embodiment of this disclosure, the readable storage medium may be any tangible medium including or storing a program, and the program may be used by or in combination with an instruction execution system, apparatus, or device.

The program product may use any combination of one or more readable media. The readable medium may be a computer-readable signal medium or a computer-readable storage medium. The readable storage medium may be, for example, but is not limited to, an electric, magnetic, optical, electromagnetic, infrared, or semi-conductive system, apparatus, or device, or any combination thereof. More specific examples (a non-exhaustive list) of the readable storage medium may include: an electrical connection having one or more wires, a portable disk, a hard disk, a RGM, a ROM, an erasable programmable ROM (EPROM or flash memory), an optical fiber, a portable CD-ROM, an optical storage device, a magnetic storage device, or any appropriate combination thereof.

The computer-readable signal medium may include a data signal propagated in a baseband or as part of a carrier, and stores readable program code. The propagated data signal may be in a plurality of forms, including but not limited to, an electromagnetic signal, an optical signal, or any appropriate combination thereof. The readable signal medium may alternatively be any readable medium other than the readable storage medium. The readable medium may be configured to transmit, propagate, or transmit a program used by or used in combination with an instruction execution system, an apparatus, or a device.

The program code included in the readable medium may be transmitted by using any appropriate medium, including but not limited to, a wireless medium, a wired medium, an optical cable, radio frequency (RF) or the like, or any appropriate combination thereof.

The program code for executing the operations of the present disclosure may be written by using any combination of one or more programming languages. The programming languages include an object-oriented programming language such as Java and C++, and also include a conventional procedural programming language such as "C" or similar programming languages. The program code may be completely executed on a user computing device, partially executed on a user device, executed as an independent software package, partially executed on a user computing device and partially executed on a remote computing device, or completely executed on a remote computing device or server. In case of the remote computing device, the remote computing device may be connected to the computing device of a user by using any network including a LAN or a WAN, or may be connected to an external computing device (for example, connected to the external computing device through the Internet by using an Internet service provider).

Although several modules or units of a device for action execution are mentioned in the foregoing detailed descriptions, the division is not mandatory. Actually, according to the implementations of this disclosure, the features and functions of two or more modules or units described above may be specified in one module or unit. Conversely, features and functions of one module or unit described above may be further divided into a plurality of modules or units to be specified.

In addition, although the various steps of the method in this disclosure are described in a specific order in the accompanying drawings, this does not require or imply that the steps are bound to be performed in the specific order, or all the steps shown are bound to be performed to achieve the expected result. Additionally or alternatively, some steps may be omitted, a plurality of steps may be combined into one step for execution, and/or one step may be decomposed into a plurality of steps for execution, and the like.

Through descriptions of the foregoing implementations, it is easy for a person skilled in the art to understand that the exemplary implementations described herein can be implemented by software or by combining software with necessary hardware. Therefore, the technical solutions of the implementations of this disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a mobile terminal, a network device, or the like) to perform the methods according to the implementations of this disclosure.

A person skilled in the art can easily figure out another implementation solution of this disclosure after considering the specification and practicing this disclosure that is disclosed herein. This disclosure is intended to cover any variations, uses or adaptive changes of this disclosure. Such variations, uses or adaptive changes follow the general principles of this disclosure, and include well-known knowledge and conventional technical means in the art that are not disclosed in this disclosure. The specification and the embodiments are merely considered as examples, and the actual scope and the spirit of this disclosure are pointed out by the following claims.

What is claimed is:

1. An image processing method, performed by an electronic device, the method comprising:
   obtaining at least one reference surface model of a first skeleton posture of a virtual object, the at least one reference model located in a reference coordinate space;
   obtaining one or more second skeleton postures of the virtual object;
   generating one or more exemplary surface models of the one or more second skeleton postures based on the at least one reference surface model and the one or more second skeleton postures;
   determining a posture transformation matrix between the first skeleton posture and the one or more second skeleton postures;
   converting the one or more exemplary surface models and the at least one reference surface model to the reference coordinate space using the posture transformation matrix to generate the virtual object according to the at least one reference surface model and the one or more exemplary surface models in the reference coordinate space, wherein converting the one or more exemplary surface models and the at least one reference surface model to the reference coordinate space using the posture transformation matrix comprises:
      performing a coordinate transformation on the one or more exemplary surface models using the posture transformation matrix to convert the one or more exemplary surface models to the reference coordinate space in which the at least one reference surface model is located;
   obtaining a target skeleton posture of the virtual object;
   performing skin processing on the at least one reference surface model based on the target skeleton posture to obtain a target skeleton-skinning model of the target skeleton posture;
   determining a modified surface model of the target skeleton posture based on the at least one reference surface model and the one or more exemplary surface models in the reference coordinate space; and generating the virtual object based on the target skeleton-skinning model and the modified surface model.

2. The method according to claim 1, wherein generating the one or more exemplary surface models of the one or more second skeleton postures based on the at least one reference surface model and the one or more second skeleton postures comprises:
performing skin processing on the at least one reference surface model based on the one or more second skeleton postures to obtain an exemplary skeleton-skinning model of the one or more second skeleton postures;
extracting surface data of the exemplary skeleton-skinning model; and
generating the one or more exemplary surface models of the one or more second skeleton postures according to the surface data.

3. The method according to claim 2, wherein before extracting the surface data of the exemplary skeleton-skinning model, the method further comprises:
obtaining a modification request for the exemplary skeleton-skinning model from a requester; and
opening a modification permission of the exemplary skeleton-skinning model to the requester after a verification on the modification request succeeds to allow the requester to modify the exemplary skeleton-skinning model; and
extracting the surface data of the exemplary skeleton-skinning model comprises extracting the surface data of the modified exemplary skeleton-skinning model.

4. The method according to claim 1, wherein determining the modified surface model of the target skeleton posture based on the at least one reference surface model and the one or more exemplary surface models in the reference coordinate space comprises:
determining, when the first skeleton posture and the one or more second skeleton postures are fused into the target skeleton posture, a weight of the first skeleton posture and a weight of the one or more second skeleton postures; and
fusing the at least one reference surface model and the one or more exemplary surface models based on the weight of the first skeleton posture and the weight of the one or more second skeleton postures to obtain the modified surface model of the target skeleton posture.

5. The method according to claim 4, wherein determining, when the first skeleton posture and the one or more second skeleton postures are fused into the target skeleton posture, the weight of the first skeleton posture and the weight of the one or more second skeleton postures comprises:
when the first skeleton posture and the one or more second skeleton posture are fused into the target skeleton posture, performing interpolation processing between the first skeleton posture and the one or more second skeleton postures by using a radial basis function to obtain the weight of the first skeleton posture and the weight of the one or more second skeleton postures.

6. The method according to claim 4, wherein fusing the at least one reference surface model and the one or more exemplary surface models based on the weight of the first skeleton posture and the weight of the one or more second skeleton postures to obtain the modified surface model of the target skeleton posture comprises:
performing weighting processing on the at least one reference surface model and the one or more exemplary surface models by using the weight of the first skeleton posture as a weight of the at least one reference surface model and using the weight of the one or more second skeleton postures as a weight of the one or more exemplary surface models to obtain the modified surface model of the target skeleton posture.

7. The method according to claim 1, wherein generating the virtual object based on the target skeleton-skinning model and the modified surface model comprises:
determining a posture transformation matrix between the first skeleton posture and the target skeleton posture as a target posture transformation matrix;
performing a coordinate transformation on the modified surface model to change from the reference coordinate space to a coordinate space of the target skeleton posture based on the target posture transformation matrix to obtain the modified surface model in the coordinate space of the target skeleton posture; and
performing surface deformation processing on the target skeleton-skinning model; and
after performing the coordinate transformation on the modified surface model, superimposing the modified surface model and the target skeleton-skinning model, to generate the virtual object.

8. The method according to claim 7, wherein before superimposing the modified surface model and the target skeleton-skinning model, the method further comprises performing surface deformation processing on the target skeleton-skinning model; and
wherein superimposing the modified surface model and the target skeleton-skinning model to generate the virtual object comprises superimposing the modified surface model and the target skeleton-skinning model obtained after the surface deformation processing to generate the virtual object.

9. The method according to claim 1, wherein obtaining the target skeleton posture of the virtual object comprises:
obtaining manipulation data for the virtual object; and
determining the target skeleton posture of the virtual object based on the manipulation data.

10. The method according to claim 1, wherein obtaining the target skeleton posture of the virtual object comprises:
obtaining sensor data;
determining a user action based on the sensor data; and
determining the target skeleton posture of the virtual object based on the user action.

11. The method according to claim 1, wherein
the one or more second skeleton postures comprises two or more second skeleton postures;
generating the one or more exemplary surface models of the one or more second skeleton postures based on the at least one reference surface model and the one or more second skeleton postures comprises:
respectively generating two or more exemplary surface models of the two or more second skeleton postures based on the at least one reference surface model and the two or more second skeleton postures.

12. The method according to claim 11, wherein
determining the posture transformation matrix between the first skeleton posture and the one or more second skeleton postures comprises:
determining a posture transformation matrix between the first skeleton posture and each of the two or more second skeleton postures; and
converting the one or more exemplary surface models and the at least one reference surface model to the reference coordinate space based on the posture transformation matrix comprises:
converting the two or more exemplary surface models and the at least one reference surface model to the reference coordinate space based on the posture transformation matrix between the first skeleton posture and each of the two or more second skeleton postures.

13. The method according to claim 12, further comprising:
obtaining a target skeleton posture of the virtual object;
performing skin processing on the at least one reference surface model based on the target skeleton posture to obtain a target skeleton-skinning model of the target skeleton posture;
determining a modified surface model of the target skeleton posture based on the at least one reference surface model and the two or more exemplary surface models in the reference coordinate space; and
generating the virtual object based on the target skeleton-skinning model and the modified surface model.

14. The method according to claim 1, further comprising:
rendering the generated virtual object, to display the virtual object in a virtual scene.

15. An electronic device, comprising:
a memory storing computer-readable instructions; and
a processor, configured to execute the computer-readable instructions stored in the memory, to cause the electronic device to:
obtain at least one reference surface model of a first skeleton posture of a virtual object, the at least one reference model located in a reference coordinate space;
obtain one or more second skeleton postures of the virtual object;
generate one or more exemplary surface models of the one or more second skeleton postures based on the at least one reference surface model and the one or more second skeleton postures;
determine a posture transformation matrix between the first skeleton posture and the one or more second skeleton postures;
convert the one or more exemplary surface models and the at least one reference surface model to the reference coordinate space using the posture transformation matrix to generate the virtual object according to the at least one reference surface model and the one or more exemplary surface models in the reference coordinate space, wherein in order to convert the one or more exemplary surface models and the at least one reference surface model to the reference coordinate space using the posture transformation matrix, the processor, upon execution of the computer-readable instructions, is configured to:
perform a coordinate transformation on the one or more exemplary surface models using the posture transformation matrix to convert the one or more exemplary surface models to the reference coordinate space in which the at least one reference surface model is located;
obtain a target skeleton posture of the virtual object;
perform skin processing on the at least one reference surface model based on the target skeleton posture to obtain a target skeleton-skinning model of the target skeleton posture;
determine a modified surface model of the target skeleton posture based on the at least one reference surface model and the one or more exemplary surface models in the reference coordinate space; and
generate the virtual object based on the target skeleton-skinning model and the modified surface model.

16. The electronic device of claim 15, wherein in order to generate the one or more exemplary surface models of the one or more second skeleton postures based on the at least one reference surface model and the one or more second skeleton postures, the processor, upon execution of the computer-readable instructions, is configured to:
perform skin processing on the at least one reference surface model based on the one or more second skeleton postures to obtain an exemplary skeleton-skinning model of the one or more second skeleton postures;
extract surface data of the exemplary skeleton-skinning model; and
generate the one or more exemplary surface models of the one or more second skeleton postures according to the surface data.

* * * * *